United States Patent [19]
van Linden et al.

[11] Patent Number: 6,074,455
[45] Date of Patent: Jun. 13, 2000

[54] ALUMINUM SCRAP MELTING PROCESS AND APPARATUS

[75] Inventors: Jan H.L. van Linden, Pittsburgh, Pa.; Chris T. Vild, Cleveland Heights, Ohio

[73] Assignee: Metaullics Systems Co., L.P., Solon, Ohio

[21] Appl. No.: 09/238,066

[22] Filed: Jan. 27, 1999

[51] Int. Cl.⁷ .............................. C22B 7/00; C22B 21/00
[52] U.S. Cl. .............................. 75/414; 75/687; 266/235; 266/900; 266/901
[58] Field of Search ................ 75/414, 686, 687; 266/235, 900, 901

[56] References Cited

U.S. PATENT DOCUMENTS

| | | | |
|---|---|---|---|
| 3,400,923 | 9/1968 | Howie et al. | 266/37 |
| 3,873,305 | 3/1975 | Claxton et al. | 75/68 |
| 3,984,234 | 10/1976 | Claxton et al. | 75/68 |
| 3,997,336 | 12/1976 | van Linden et al. | 75/68 |
| 4,128,415 | 12/1978 | van Linden et al. | 75/65 |
| 4,147,531 | 4/1979 | Miller | 75/44 |
| 4,286,985 | 9/1981 | van Linden et al. | 75/65 |
| 4,437,650 | 3/1984 | van Linden | 266/144 |
| 4,486,228 | 12/1984 | Ormesher | 75/65 |
| 4,491,474 | 1/1985 | Ormesher | 75/65 |
| 4,491,475 | 1/1985 | Zuber et al. | 75/65 |
| 4,518,424 | 5/1985 | Ormesher | 75/65 |
| 4,598,899 | 7/1986 | Cooper | 266/212 |
| 4,601,750 | 7/1986 | Robak et al. | 75/65 |
| 4,702,768 | 10/1987 | Areauz et al. | 75/65 |
| 4,884,786 | 12/1989 | Gillespie | 266/235 |
| 4,907,784 | 3/1990 | Kusaka et al. | 266/235 |
| 4,983,216 | 1/1991 | van Linden et al. | 76/672 |
| 5,135,202 | 8/1992 | Yamashita et al. | 266/233 |
| 5,268,020 | 12/1993 | Claxton | 75/708 |
| 5,294,245 | 3/1994 | Gilbert et al. | 75/571 |
| 5,772,725 | 6/1998 | Eckert | 75/10.18 |
| 5,984,999 | 11/1999 | Areaux | 75/687 |

FOREIGN PATENT DOCUMENTS

| | | |
|---|---|---|
| 119094 | 9/1984 | European Pat. Off. |
| 1413153 | 7/1988 | Russian Federation |

Primary Examiner—Melvyn Andrews
Attorney, Agent, or Firm—Andrew Alexander

[57] ABSTRACT

A method of melting metal scrap in a molten melting media, the method comprising (a) providing a source of molten melting media in a furnace, the melting media in the furnace having a first surface level; (b) providing a first melting bay in fluid communication with the furnace to receive molten melting media from the furnace to provide a body of molten melting media in the first melting bay for purposes of melting floatable metal scrap, the first melting bay having: (i) a bottom; and (ii) an outer wall connected to the bottom defining the first melting bay, the outer wall having a generally spiral shaped cross section terminating in a mouth of a channel for removing melting media and molten scrap to an adjacent bay, the spiral shaped cross section receding away from a generally central axis of the first melting bay.

26 Claims, 5 Drawing Sheets

ALUMINUM SCRAP MELTING PROCESS AND APPARATUS

BACKGROUND OF THE INVENTION

This invention relates to aluminum scrap and more particularly, it relates to an improved method and apparatus for melting metal scrap such as aluminum scrap.

Aluminum scrap can be divided into two general categories. The first category of scrap is comprised of large parts such as internal combustion engine parts or other vehicular parts which are generally self submerging. The second category of scrap is termed lightweight or flowable scrap such as shredded food and beverage containers or machining chips or filings. The lightweight scrap is difficult to submerge and thus is difficult to melt.

Further, conventional melting systems for lightweight scrap have the problem that often the scrap can build up in the melting bay, seriously interfering with the efficiency of the process. Such conventional systems also lead to higher levels of skim formation and melt loss resulting from the aluminum that is converted to oxide and free aluminum metal that is occluded in the skim. In addition to the melt loss, high levels of skim have the problem that more intense processing is required downstream to separate these materials in order to provide purified metal. Such systems, for example, for melting metal scrap are set forth in U.S. Pat. No. 4,128,415. This patent discloses a system for melting metal scrap in a molten melting media which includes a housing generally cylindrical in cross section and having upper and lower portions. Metal scrap is introduced to a body of molten melting media contained in the upper portion of the housing. A supply of molten melting media is added to the upper portion of the housing through a volute located in the lower portion. The molten melting media is supplied or added by action of an impeller located in the lower portion and mounted on a drive shaft extending through the upper portion. Vanes are mounted on the drive shaft to control the flow motion of the body of molten melting media and metal scrap in the upper portion of the housing by creating a vortex in this body for purposes of mixing the melting media and metal scrap.

U.S. Pat. No. 3,997,336 discloses a system for melting metal scrap in a molten melting media which comprises a housing having an upper portion wherein the melting media and scrap are brought together to initiate melting. The housing also has a lower portion in which a volute is located. An impeller, having a central hub, a circumferential band surrounding the hub, and canted vanes projecting radially from the hub to the band, is positioned in the lower portion of the housing to cooperate with the volute so that upon rotation of the impeller, metal scrap and melting media are moved downwardly and out of the housing.

U.S. Pat. No. 4,601,750 discloses a process for removing hydrocarbon combustibles from the surface of metal particles and recovering the heat content therefrom. The process is carried out in a system having a smoke collection zone, a heating zone and burner means supplied with fuel and air. The process includes charging the metal particles into a moving molten metal bath contained in the smoke collection zone.

U.S. Pat. No. 4,518,424 discloses an improved method of melting metal scrap in a molten melting media. The method comprises the steps of providing a body of molten melting media in a housing having an upper portion and a lower portion, the lower portion having a generally cylindrical wall section. A supply of metal scrap is added to the housing and a supply of molten melting media is introduced to the upper portion of the housing. Melting of the metal scrap is initiated by ingesting it and molten melting media downwardly in the housing by action of an impeller positioned in the lower portion, the impeller having a flat ring member having an opening in the center thereof and having blades extending from said ring member to a substantially circular disc member.

U.S. Pat. No. 4,486,228 discloses an improved method of melting metal scrap in a molten melting media. The method comprises the steps of providing a body of molten melting media in a housing having an upper portion and a lower portion, the lower portion having a generally cylindrical wall section. A supply of metal scrap is added to the housing and a supply of molten melting media is introduced to the upper portion of the housing. Melting of the metal scrap is initiated by ingesting it and molten melting media downwardly in the housing by action of an impeller positioned in the lower portion, the impeller having a flat ring member having an opening in the center thereof and having blades extending from said ring member to a substantially circular disc member. The scrap and melting media enters the opening in the ring member in an axial direction and is propelled therefrom in a radial direction by use of the blades. The impeller is positioned in the cylindrical wall section such that at least the ring member cooperates therewith to move the scrap and melting media from the upper portion through said impeller while substantially avoiding recirculation of the molten melting media within the housing to the upper portion.

U.S. Pat. No. 4,437,650 discloses an apparatus for melting relatively large floating units of metal scrap in a molten melting media or medium, the units having oxide films and solid, liquid and gaseous inclusions. After the units are charged into a melting medium, layers of freshly melted metal are presented to the molten media. The apparatus includes a bay for heating the molten media and means for pumping the media from the heating bay to a circular bay for receiving the large units of metal scrap.

U.S. Pat. No. 4,286,985 discloses a vortex melting system for ingesting and melting metal scrap that otherwise tends to float on the surface of a molten melting media. The method includes the steps of providing a supply of the melting media and directing the media from the supply to an upper portion of a receptacle having an outlet opening in the lower portion thereof. The flow of the melting media entering the receptacle produces a free vortex of the media in the receptacle, as the media flows out the lower opening. The amount of the flow of the melting media to the receptacle and the size of the lower opening are such that a predetermined level of the media is maintained in the receptacle.

U.S. Pat. No. 4,147,531 discloses a method for removing volatilizable and combustible impurities from the surface of metallic scrap comprising the steps of continuously depositing surface contaminated scrap onto the surface of a stream of molten metal, directly propelling the floating scrap along the molten surface for a time sufficient for the heat from the molten metal to effectuate substantially complete removal of the contaminants from the scrap and forcibly submerging the remaining decontaminated scrap into the molten metal stream.

In U.S. Pat. No. 3,873,305, recycled aluminum containers and other charges of aluminum or other metals comprising pieces and particles are rapidly melted by forced submergence in a moving stream or system of molten melting media. For melting aluminum the media can be molten aluminum or a molten salt. The charge is forcibly submerged by the action of a rotating wedge blade situated within a downwardly diverging conduit.

In spite of these disclosures, there is still a great need for a system for efficiently ingesting and melting aluminum scrap without buildup of scrap or skim in the melting bay and its attendant problems. Further, such system should be adaptable to melting self-submerging scrap. The present system provides a system which overcomes problems in the art and in particular buildup of scrap and/or skim in the charging and melting bay.

SUMMARY OF THE INVENTION

It is an object of the present invention to provide a process for melting metal scrap.

It is another object of this invention to provide a process for ingesting and melting flowable or lightweight aluminum scrap such as shredded food and beverage containers and machining chips.

Yet, it is another object of this invention to provide a method and apparatus for melting aluminum scrap without buildup and re-ingesting skim or dross.

Still, it is another object of this invention to provide a recirculating system for melting lightweight flowable aluminum scrap in a melting bay and transferring the melt to a treatment bay, e.g., fluxing, to remove skim before being returned to the furnace.

And still, it is another object of the present invention to provide a recirculating system for melting lightweight flowable aluminum scrap in a first melting bay followed by melting large self-submerging scrap in an adjacent or second bay with treatments such as fluxing to remove skim.

These and other objects will become apparent from a reading of the specification and claims appended hereto.

In accordance with these objects, there is disclosed a method for melting metal scrap in a molten melting media. The method comprises providing a source of molten melting media in a furnace, the melting media in the furnace having a first surface level. The method also includes providing a melting bay in fluid communication with the furnace to receive molten melting media therefrom to provide a body of molten melting media in the melting bay for purposes of melting metal scrap. The melting bay has a bottom connected to an outer wall which has a generally spiral shaped cross section. The spiral shaped wall terminates or flows into the mouth of a channel used for removing or directing melting media and molten scrap to an adjacent bay. The spiral shaped cross section recedes away from the generally central axis of the melting bay. In the method, molten melting media is supplied to the melting bay through an opening in the bottom, the supply being achieved with an impeller mounted on a shaft projecting into the bay. The impeller cooperates with the opening to force molten melting media into the bay and is positioned to rotate towards the mouth of the channel to direct molten melting media into and through the channel to the adjacent bay. The molten melting media in the melting bay is maintained at a level higher than the level in the furnace. Metal scrap is added to a vortex generated in the melting bay for ingesting scrap into the media for enhanced melting. The molten melting media and molten metal scrap are directed through the channel out of the melting bay into an adjacent bay. The level of molten media in the adjacent bay is maintained lower than the level in the melting bay.

DETAILED DESCRIPTION OF THE PREFERRED EMBODIMENTS

Figure 1:
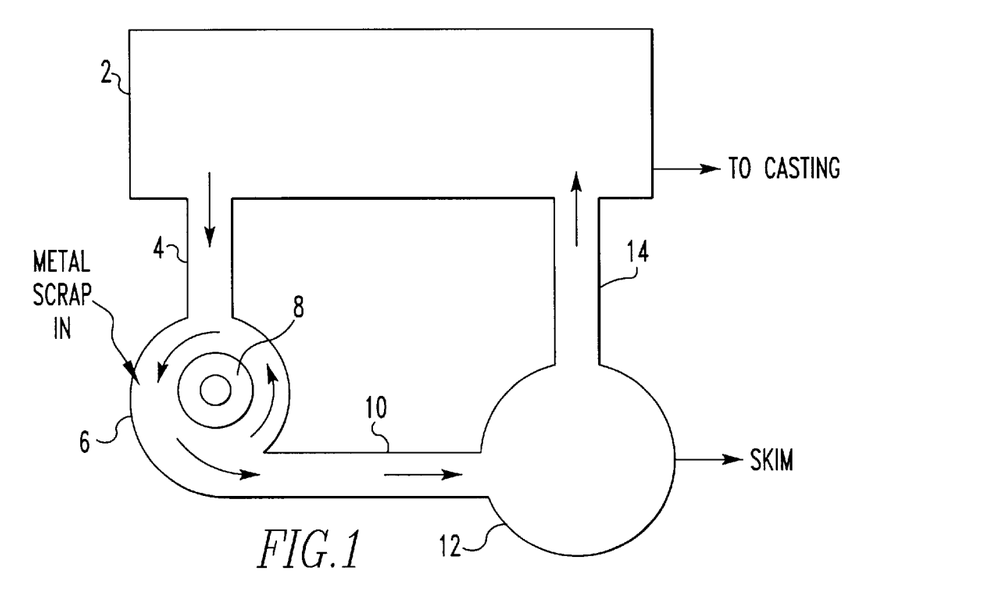
FIG. 1 is a schematic view of the invention showing a furnace, a melting bay and an adjacent bay which may be used for fluxing operations to remove skim or dross.

Referring now to FIG. 1, there is shown a schematic of a system for melting lightweight or flowable metal scrap in accordance with the invention. In FIG. 1 there is shown a furnace 2 for heating and containing a source of molten melting media such as molten metal, e.g., molten aluminum, used for melting the metal scrap. Molten melting media is removed from furnace 2 along line 4 to melting bay 6. In melting bay 6, impeller 8 operates to circulate molten melting media from furnace 2 through melting bay 6 along line 10 into adjacent bay 12 and along line 14 back into furnace 2. Melting bay 6 is not only used for pumping for purposes of recirculating molten melting media but also is used for scrap charging and melting, all of which occurs simultaneously.

Bay 12 is typically used for fluxing the melt for purposes of removing skim or dross generated during the melting process. In the fluxing process, skim is floated to the surface of the melt using fluxing gas such as chlorine and/or inert gases such as argon to provide purified molten metal which is returned to furnace 2. The skim is removed from the surface of the melt in bay 12 by raking or similar process. Processes for fluxing are more fully described, for example, in U.S. Pat. No. 5,364,450, incorporated herein by reference.

When melting aluminum scrap, the molten melting media is typically molten aluminum. The molten aluminum in furnace 2 is heated to a temperature of about 1320° to 1500° F. prior to charging scrap. A typical temperature leaving furnace 2 is about 1375° F. Consistently higher temperatures can result in higher levels of skim formation. The temperature of molten metal returning to furnace 2 along line 14 is about 1240° to 1300° F., depending on the circulation rates. This provides sufficient heat for melting aluminum scrap without concern for solidification. These temperatures depend on molten metal flow rates and rates of addition of aluminum scrap to bay 6 for purposes of melting. For example, the present system can be designed to have a thermal capacity for sustaining a charge rate of 6000 pounds of scrap per hour which requires about 3 million BTU per hour from the circulating molten metal for purposes of melting the scrap. If it is desired to have the returning metal at a temperature of 1300° F., the circulation rate should be about 150,000 pounds per hour of molten metal. If the return temperature can be 1250° F., then the required circulation rate can be only 85,000 pounds per hour. Further, it will be appreciated that molten metal can be withdrawn from furnace 2 at about the rate of addition of metal scrap to melting bay 6, either constantly or perodically.

While reference has been made herein to molten metal for purposes of melting, it should be noted that molten salt may be employed, and such is contemplated within the purview of the invention. However, when salt is used, a molten salt separator is used to separate the molten salt from the molten metal. In addition, it should be noted that the type of aluminum scrap for which the melting system in FIG. 1 is best suited is the finely divided scrap resulting from food and beverage containers and machining operations which tends to float on molten aluminum and therefore requires forceful ingestion to quickly submerge and efficiently melt such scrap.

Figure 2:
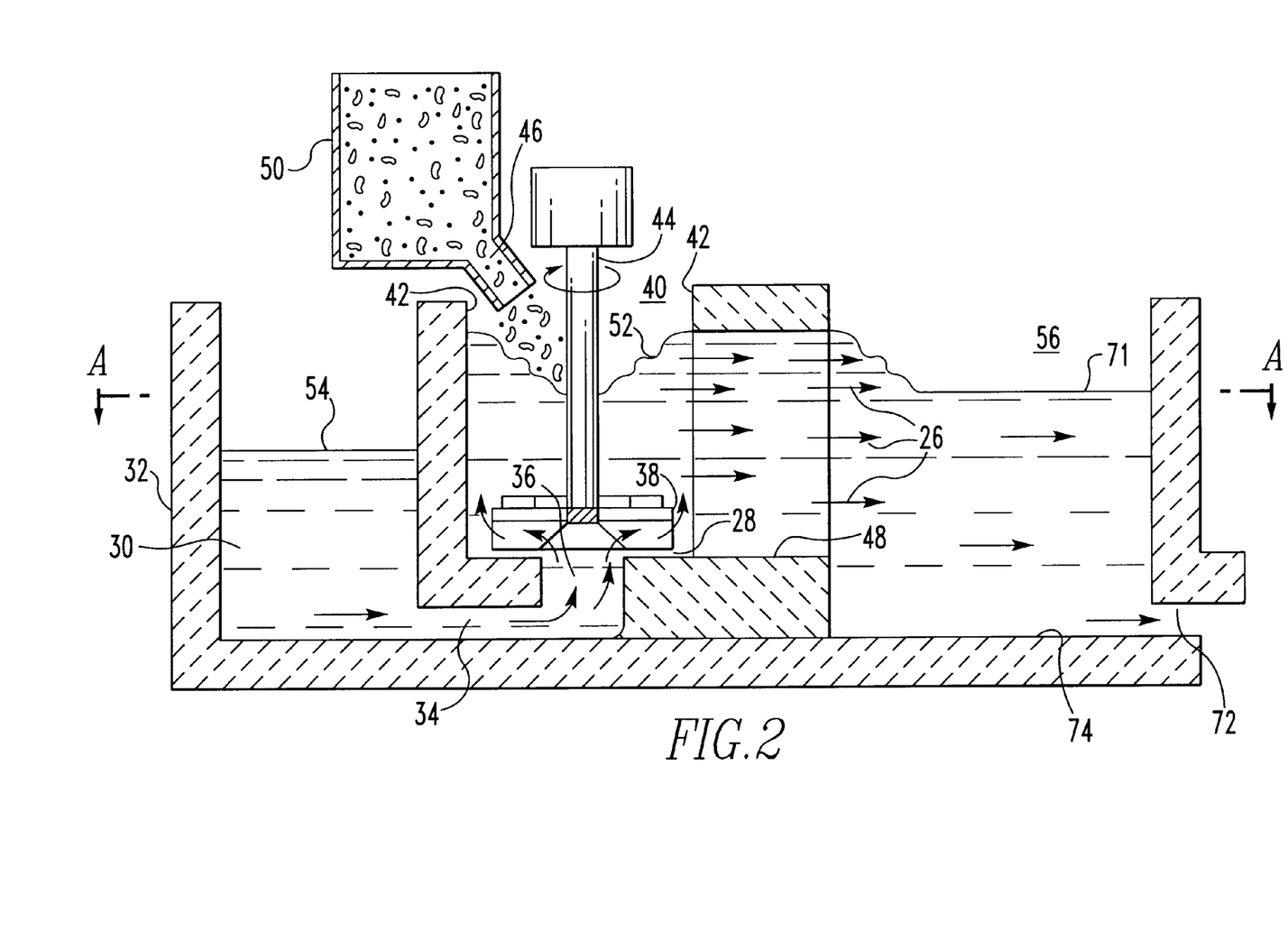
FIG. 2 is a cross-sectional view showing a source of melting media, a melting bay for melting lightweight or flowable scrap and an adjacent bay for fluxing.

A cross-sectional view of a recirculating system is shown in FIG. 2 where molten melting media 30 is shown in hot bay 32 which may be a furnace or other source of hot melting media. In FIG. 2, melting media is drawn through conduit 34 and opening 36 by action of impeller 38. Any design of impeller can be used which draws molten metal from bay 32 into melting bay 40. In the preferred operation, impeller 38 draws molten metal through opening 36 and forces it upwardly into melting bay 40. Preferably, the action of impeller 38 results in the molten metal being forced upwardly in melting bay 40 along walls 42 and further preferably the pumping action of impeller 38 results in a vortex forming about shaft 44 to provide for fast and efficient ingestion of scrap particles 46 as they are discharged from hopper 50. Thus, preferably the flow direction in bay 40 is described as generally upwardly at walls 42 and downwardly in a vortex about impeller shaft 44. In addition, the pumping action of impeller 38 creates a rotating action to the vortex in bay 40 to both ingest and to melt scrap efficiently and to move the melting media and molten scrap quickly out of bay 40 in accordance with the invention. Any impeller which creates this type of flow pattern in bay 40 may be used. One such impeller is described in U.S. Pat. No. 4,128,415, incorporated herein by reference, which describes an axial input radial discharge impeller. However, other design impellers may be used, for example, axial flow through impellers. With axial flow through impellers, deflectors or baffles should be employed to provide the vortex and flow pattern described above. Axial flow through impellers are described, for example, in U.S. Pat. No. 4,486,228, incorporated herein by reference. If the axial flow pump is operated without deflectors, a plume of molten melting material is obtained around shaft 44 with the circulation being downwardly at walls 42. It is this downward motion of the molten melting media which operates to ingest and melt the metal scrap particles. However, this is a less preferred flow pattern.

In another embodiment of the invention, it is preferred to operate the melting system with the molten melting media maintained at controlled levels. That is, as shown in FIG. 2, it is preferred to maintain the molten melting media at a surface level above level 54 of hot bay 32. This is achieved by controlling the pumping action of impeller 38 and by controlling the rate at which melting media and molten scrap exit melting bay 40. Maintaining level 52 higher than level 54 has the advantage that melting can be accomplished at a constant rate and independent of the level of molten melting media in hot bay or furnace 32. Also, bay 56 is operated or maintained at a level 59 below that of melting bay 40.

Figure 5:
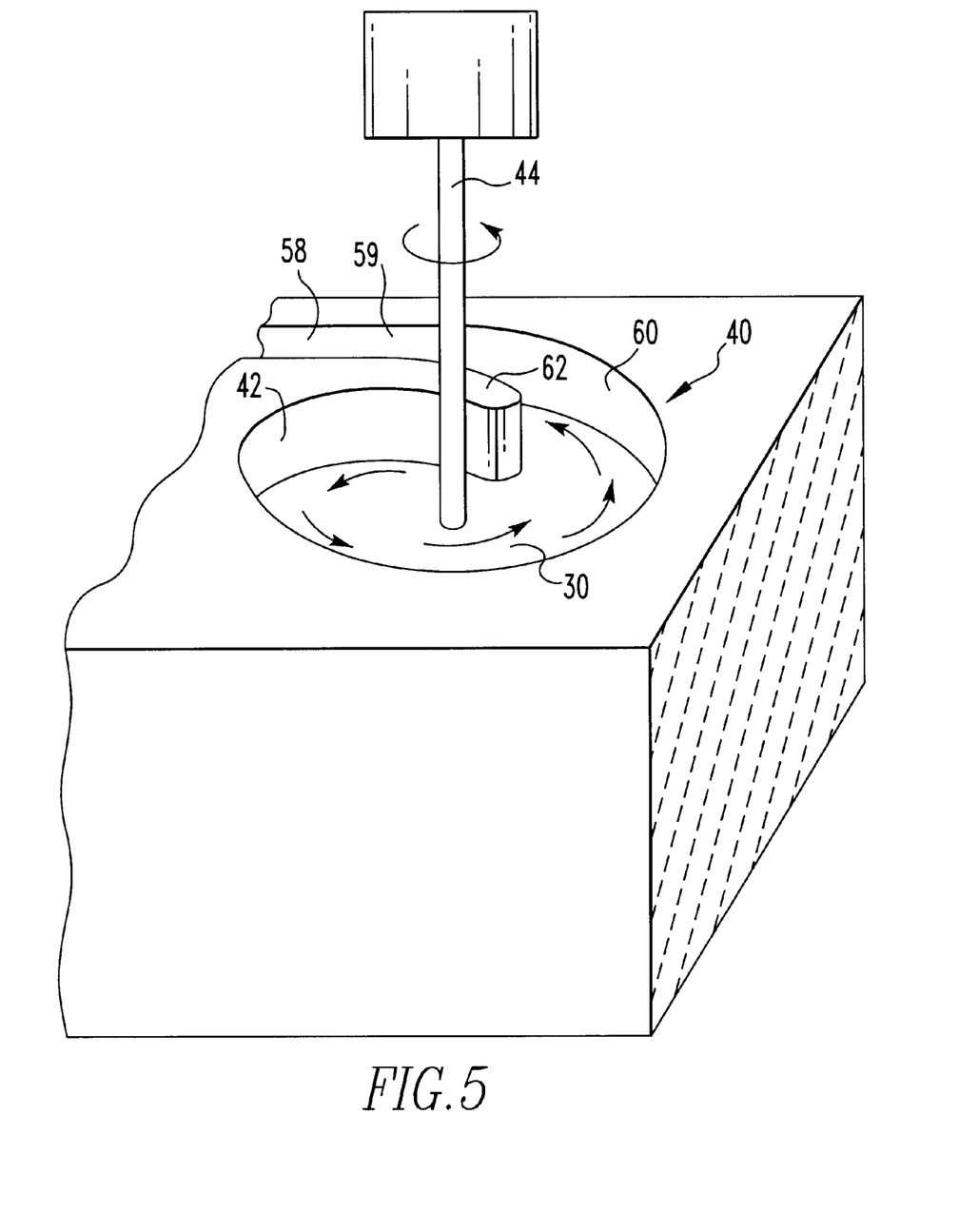
FIG. 5 is a perspective view showing the configuration of the scrap charging and melting bay.
Figure 6:
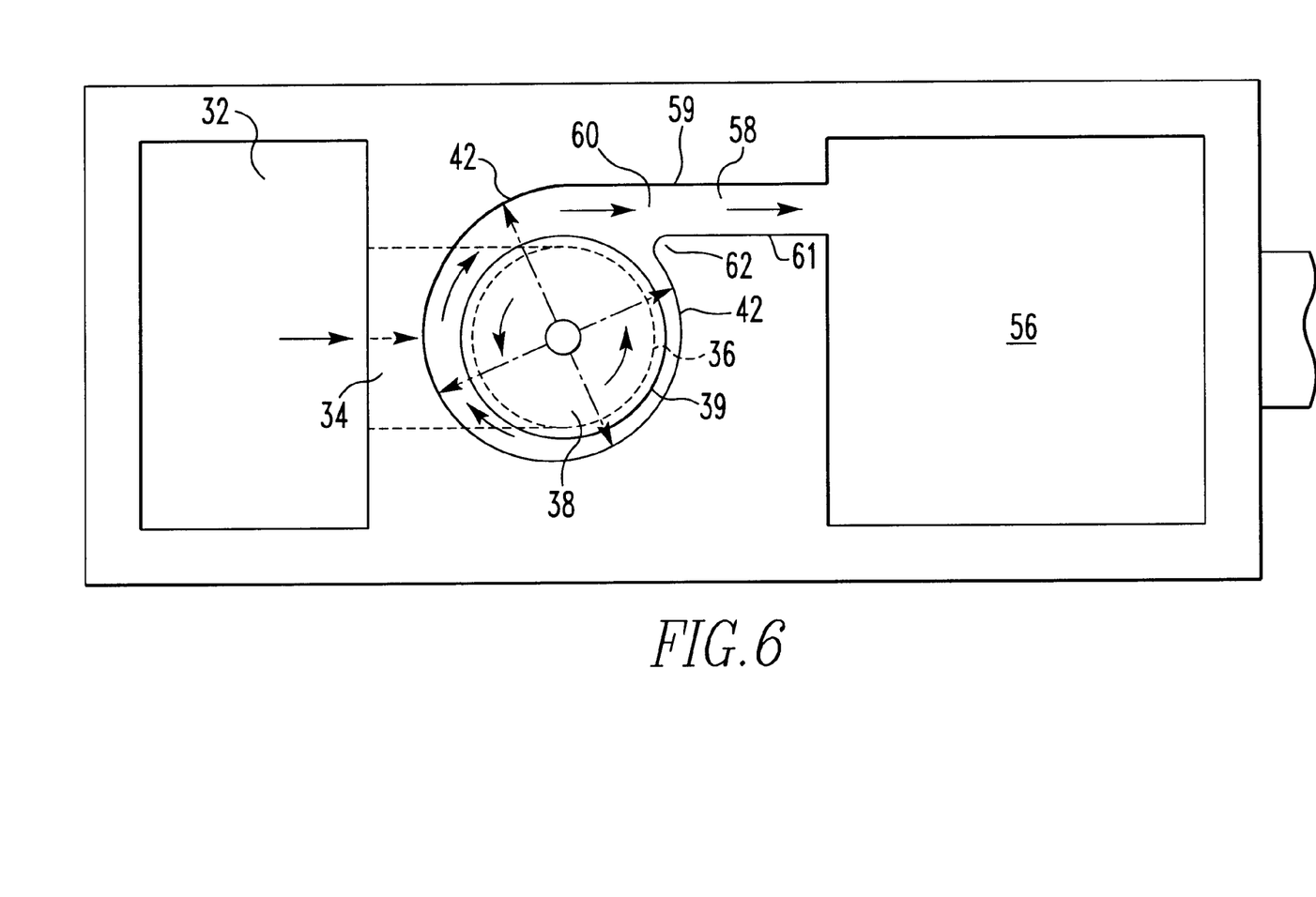
FIG. 6 is a view along the line A—A of FIG. 2.

The shape or configuration of melting bay 40 and the placement or location of impeller 38 in melting bay 40, particularly in respect of wall 42, is an important feature of the present invention, as will be best seen in FIGS. 5 and 6. In FIG. 5, which is a dimensional view, melting bay 40 is shown with shaft 44 of impeller 38 projecting into melt 30. Melting bay 40 is shown having wall 42 which terminates in or becomes part of channel 58. Molten melting media and molten metal scrap exit melting bay 40 through channel 58. Further, it will be noted in FIGS. 5 and 6 that shaft 44 and therefore impeller 38 are powered so as to rotate shaft 44 and impeller 38 in the direction of mouth 60. This is an important feature which permits higher flow rates and metal scrap charging rates as well as discharge of the melting media and molten scrap very efficiently and effectively without buildup of metal scrap or skim in bay 40. Thus, impeller 38 rotates to circulate melt 30 in the direction of mouth 60 and to expel melt along channel 58 out of bay 40 into adjacent bay 56.

For purposes of efficiently expelling molten melting media and molten scrap from melting bay 40, wall 42 has a specially shaped configuration. That is, wall 42 is fabricated into a spiral shape starting at about point 62 and continually receding away from a vertical axis to about mouth 60. The vertical axis may be approximated by shaft 44 of the impeller. However, other locations in melting bay 40 may be used for approximating the vertical axis. From FIG. 6, it will be seen that wall 42 recedes away from outer circumference 39 of impeller 38 moving in a clockwise direction after point 62 to about mouth 60. At about mouth 60, wall 42 joins to or terminates in wall 59 of channel 58. It will be understood that in the preferred embodiment wall 42 approximates a spiral shape from about point 62 to wall 59. However, part of wall 42 can be a sector of a circle or a series of circle segments starting at about point 62 before spiraling away from circumference 39 of impeller 38 to join to wall 59 leading the metal essentially in this manner towards mouth 60.

Also, for purposes of the present invention, it is preferred that wall 42 is formed generally vertically as shown, for example, in FIG. 2. Further, it is preferred that walls 59 and 61 extend generally vertically to complement wall 42. In addition, it is preferred that channel 58 extends downwardly to form a bottom 48 contiguous with bottom 28 of melting bay 40. Having bottom 48 of channel 58 contiguous with bottom 28 of melting bay 40 accelerates expulsion of molten melting media and molten scrap from the melting bay, greatly facilitating the efficiency of the melting system. It will be understood that bottom 48 of channel 58 may be located above or below bottom 28, and such is contemplated within the purview of the invention. In FIG. 2, arrows denoted by 26 represent flow through channel 58 extending to bottom 48. As noted, this illustrates flow through channel 58 with a depth commensurate with the depth of melting bay 40.

While bay 40 in combination with impeller 38 have been described in terms of ingesting and melting metal scrap, it should be appreciated that this combination can be used for molten metal pumping operations where it is desired to provide for high levels of circulation. For example, if it is desired to melt self-submerging scrap or ingot in furnace 2 (FIG. 1), then the pumping arrangement as described in FIG. 2 utilizing full depth channel 58, i.e., approximate depth of bay 40, can be used for high circulation rates. Such process can use a fluxing bay 12 to remove skim, if desired. However, bay 40 and impeller 38 can be used as a pump to circulate molten metal to and from furnace 2 for a number of reasons in addition to charging floatable scrap.

Figure 3:
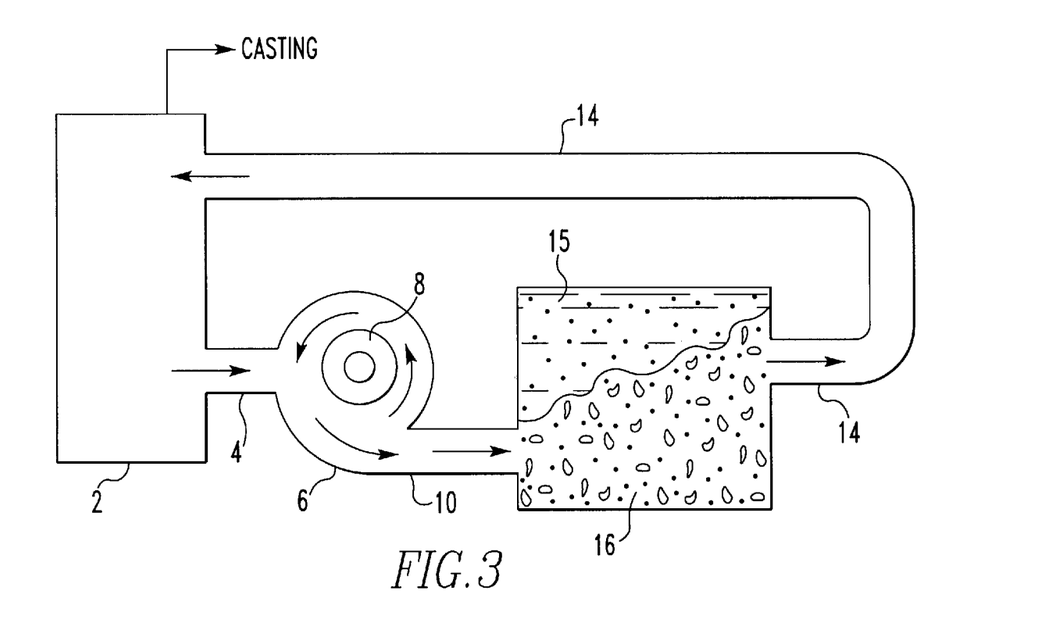
FIG. 3 is a top view of the invention showing a furnace, melting bay for melting light or flowable aluminum scrap and an adjacent bay for melting large pieces of self-submerging aluminum scrap.

FIG. 3 is a schematic of a melting system in accordance with the invention suitable for melting both flowable or lightweight aluminum scrap and self-submerging aluminum scrap such as ingot. Thus, there is shown a furnace 2 wherein molten melting media is directed along channel 4 to lightweight aluminum scrap ingesting, melting and pumping bay 6. Molten metal is pumped using pump 8. Molten melting media and molten scrap is directed along conduit 10 to bay 16 where heavy or self-submerging scrap can be charged. Molten melting media and molten scrap is directed along 14 back to furnace 2. In the system shown in FIG. 3, a fluxing bay can be provided between bay 6 and bay 16 for removal of skim. Further, skim shown on bay 16 may be removed by raking or other means. It will be appreciated that furnace temperature may be required to be elevated or flow rates of molten melting media increase to accommodate use of both melting bays. In any event, the ΔT between flow from and to the furnace, along with molten metal flow rate and metal scrap charge rate are required to be balanced in the system to operate on a continuous basis with freedom from freezing and excess skim generation.

Figure 4:
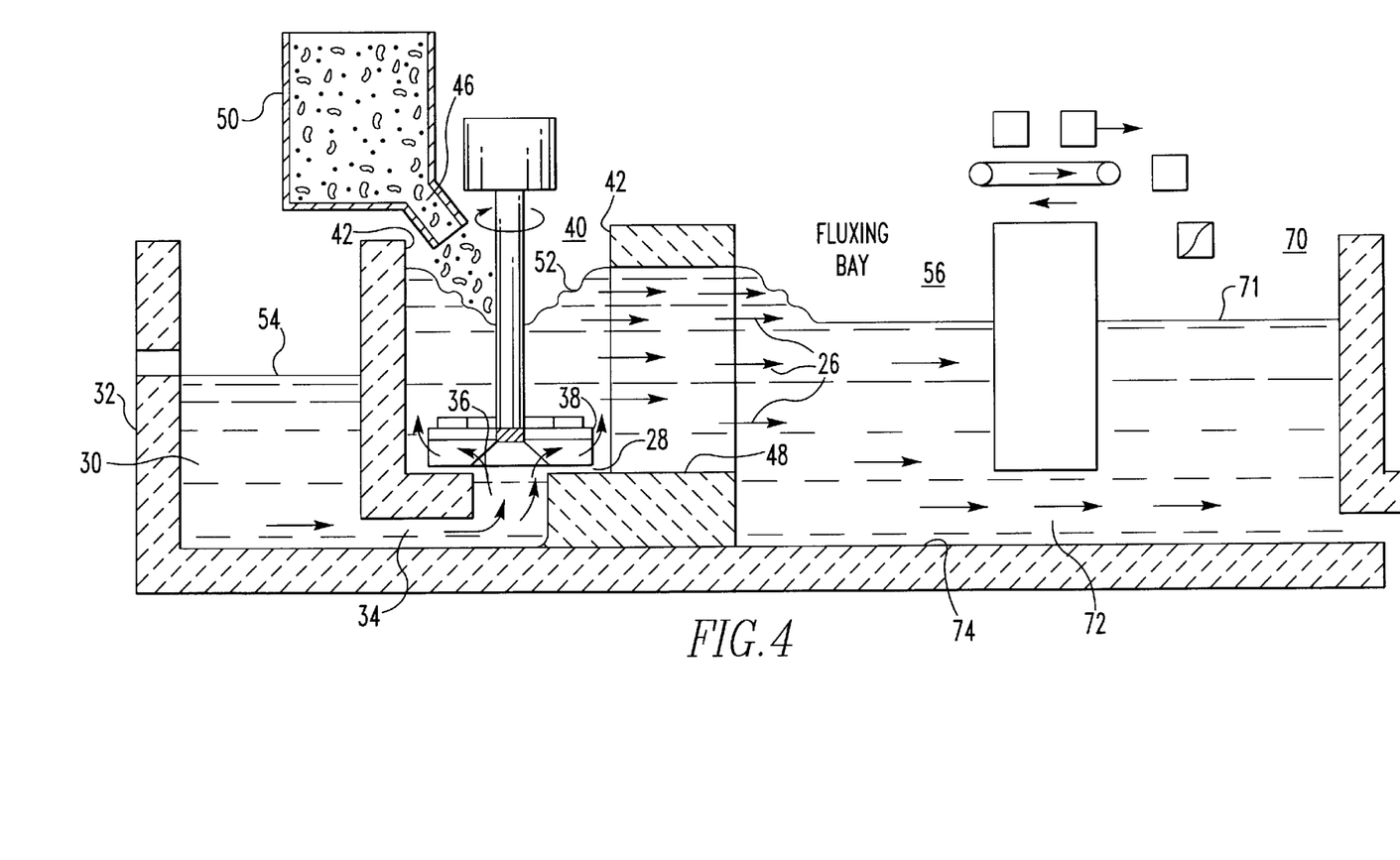
FIG. 4 is a schematic cross-sectional view of a system similar to that shown in FIG. 3 except showing a fluxing bay.

FIG. 4 is an elevation view similar to the system in FIG. 3 except showing a fluxing bay between pumping bay 6 and heavy scrap charging bay 16. In FIG. 4, furnace or hot bay 32, pumping bay 40 and fluxing bay 56 are as described with respect to FIG. 2. Bay 70 into which melt is discharged from bay 56 is used for melting large pieces of aluminum scrap such as ingot or automotive engine parts. This system has the advantage that both flowable or lightweight scrap and heavy or self-submerging scrap can be melted or recovered in the same system without generation of skim in the furnace. That is, after the lightweight scrap has been melted, the melt can be subjected to a fluxing process in bay 56, as described. The skim is removed in bay 56 and only clean metal is used for melting ingot, for example, before being returned to the furnace or holding bay. Further, melting bay 56 has the advantage that skim generated in pumping and melting bay 40 is collected on side 15 of the surface of bay 56 and removed, permitting heavy or self-submerging scrap to be charged or added in an area or bay 70 substantially skim-free. This is illustrated in FIG. 3 wherein skim is shown collecting on side 15, leaving the opposite side substantially free of skim which permits charging of large or heavy aluminum scrap with only minimal entrainment of skim from bay 6.

Further, it will be appreciated that the system described with respect to FIGS. 3 and 4 can be used for charging heavy scrap and bay 6 (FIG. 3) or 40 (FIG. 4) operated as a pumping bay. Such mode of operation is contemplated within the purview of the invention.

Bay 56 is shown with opening 72 which discharges molten metal into bay 70. Materials of construction of the bays and impeller can be any material such as refractories resistant to corrosive attack by molten metal, e.g., aluminum, or by molten salt. Such materials can include silicon carbide for the bays. Also, graphite can be used for the impeller shafts.

While the invention has been described in terms of preferred embodiments, the claims appended hereto are intended to encompass other embodiments which fall within the spirit of the invention.

What is claimed is:

1. A method of melting metal scrap in a molten melting media, the method comprising:
   (a) providing a source of molten melting media in a furnace, the melting media in said furnace having a first surface level;
   (b) providing a first melting bay in fluid communication with said furnace to receive molten melting media from said furnace to provide a body of molten melting media in said first melting bay for purposes of melting floatable metal scrap, the first melting bay having:
      (i) a bottom; and
      (ii) an outer wall connected to said bottom defining said first melting bay, said outer wall having a generally spiral shaped cross section terminating in a mouth of a channel for removing melting media and molten scrap to an adjacent bay, said spiral shaped cross section receding away from a generally central axis of said first melting bay;
   (c) supplying molten melting media to said first melting bay through an opening in said bottom, said supplying being achieved with an impeller mounted on a shaft projecting into said first melting bay, said impeller:
      (i) cooperating with said opening to force molten melting media into said first melting bay,
      (ii) positioned to rotate towards said mouth of said channel to direct molten melting media and molten scrap into said channel;
   (d) maintaining molten melting media in said first melting bay at a level higher than said first furnace level;
   (e) generating a vortex in said first melting bay for ingesting said floatable metal scrap into said media for enhanced melting;
   (f) adding said floatable metal scrap to said first melting bay and melting said metal scrap therein; and
   (g) directing molten melting media and molten metal scrap through said channel out of said first melting bay into an adjacent bay, said level of molten media in said adjacent bay maintained lower than the level in said first melting bay.

2. The method in accordance with claim 1 including providing said channel with a floor contiguous with said bottom to provide a channel having a depth which extends from at least about said level of said melting media in said first melting bay to said bottom of said first melting bay.

3. The method in accordance with claim 1 including providing a second melting bay between said first melting bay and said adjacent bay and melting self-submerging metal scrap in said second melting bay.

4. The method in accordance with claim 1 wherein molten melting media is molten aluminum and said floatable metal scrap is aluminum metal scrap.

5. The method in accordance with claim 3 wherein said self-submerging metal scrap is aluminum metal scrap.

6. The method in accordance with claim 1 including supplying said molten melting media to said first bay at a temperature in the range of 1320° to 1500° F.

7. The method in accordance with claim 1 including fluxing said molten melting media and said molten scrap in said adjacent bay to remove suspended solids therefrom.

8. A method of melting floatable aluminum scrap in a molten aluminum, the method comprising:
   (a) providing a source of molten aluminum in a furnace, the molten aluminum in said furnace having a first surface level;
   (b) providing a first melting bay in fluid communication with said furnace to receive molten aluminum from said furnace to provide a body of molten aluminum in said first melting bay at a level for purposes of melting floatable aluminum scrap, the first melting bay having:
      (i) a bottom; and
      (ii) an outer wall connected to said bottom defining said first melting bay, said outer wall having a generally spiral shaped cross section terminating in a mouth of a channel for removing molten aluminum to an adjacent bay, said spiral shaped cross section receding away from a generally central axis of said first melting bay, said channel having a floor contiguous with said bottom to provide said channel with a depth extending from the level of the molten aluminum in said first melting bay to the bottom of said first melting bay;

(c) supplying molten aluminum to said first melting bay through an opening in said bottom, said supplying being achieved with an impeller mounted on a shaft projecting into said first melting bay, said impeller:
  (i) cooperating with said opening to force molten aluminum into said first melting bay;
  (ii) positioned to rotate towards said mouth of said channel to direct molten aluminum and molten scrap into said channel;
(d) maintaining molten aluminum in said first melting bay at a level higher than said first furnace level;
(e) generating a vortex in said first melting bay for ingesting scrap into said molten aluminum for enhanced melting;
(f) adding floatable scrap metal to said first melting bay and melting aluminum scrap therein; and
(g) directing molten aluminum through said channel out of said first melting bay into an adjacent bay, said level of molten aluminum in said adjacent bay maintained lower than the level in said first melting bay.

9. A method for melting both floatable metal scrap and self-submerging metal scrap in a molten melting media, the method comprising:
(a) providing a source of molten melting media in a furnace, the melting media in said furnace having a first surface level;
(b) providing a first melting bay in fluid communication with said furnace to receive molten melting media from said furnace to provide a body of molten melting media in said first melting bay for purposes of melting floatable metal scrap, the first melting bay having:
  (i) a bottom; and
  (ii) an outer wall connected to said bottom defining said first melting bay, said outer wall having a generally spiral shaped cross section terminating in a mouth of a channel for removing melting media and molten scrap from said first melting bay, said spiral shaped cross section receding away from a generally central axis of said first melting bay;
(c) supplying molten melting media to said first melting bay through an opening in said bottom, said supplying being achieved with an impeller mounted on a shaft projecting into said first melting bay, said impeller:
  (i) cooperating with said opening to force molten melting media into said first melting bay;
  (ii) positioned to rotate towards said mouth of said channel to direct molten melting media and molten scrap into said channel;
(d) maintaining molten melting media in said first melting bay at a level higher than said first furnace level;
(e) generating a vortex in said first melting bay for ingesting floatable metal scrap into said media for enhanced melting;
(f) adding floatable metal scrap to said first melting bay and melting said metal scrap therein;
(g) providing a second melting bay in fluid communication through said channel with said first melting bay;
(h) directing molten melting media and molten metal scrap through said channel out of said first melting bay into said second melting bay; and
(i) adding self-submerging metal scrap to said second melting bay and melting said self-submerging metal scrap therein.

10. The method in accordance with claim 9 including providing said channel with a floor contiguous with said bottom to provide a channel having a depth extending from at least about said level of said melting media in said first melting bay to said bottom of said first melting bay.

11. The method in accordance with claim 9 wherein molten melting media is molten aluminum and said metal scrap is aluminum metal scrap.

12. The method in accordance with claim 9 including supplying said molten melting media to said first bay at a temperature in the range of 1320° to 1500° F.

13. The method in accordance with claim 9 including fluxing said molten melting media and said molten scrap in said adjacent bay to remove suspended solids therefrom.

14. In an improved melting process for melting floatable metal scrap in a molten melting media wherein molten melting media is provided in a furnace to provide a source of molten melting media, wherein a first melting bay is provided having a body of melting media and in fluid communication with said furnace and wherein a supply of floatable metal scrap is provided for adding to said first melting bay for melting therein, the improvement comprising:
(a) providing said first melting bay with:
  (i) a bottom having an opening therein; and
  (ii) an outer wall connected to said bottom for containing said melting media, said outer wall having a generally spiral shaped cross section terminating in a mouth of a channel for removing melting media and molten scrap to an adjacent bay, said spiral shaped cross section receding away from a generally central axis of said first melting bay, said opening adapted for supplying molten melting media to said first melting bay using an impeller mounted on a shaft projecting into said first melting bay, said impeller:
    (1) cooperating with said opening to force molten melting media into said first melting bay;
    (2) positioned to rotate towards said mouth of said channel to direct a portion of said molten melting media and molten scrap into said channel; and
    (3) adapted for generating a vortex in said melting media in said first melting bay for ingesting said floatable metal scrap and for directing molten melting media and molten scrap into an adjacent bay.

15. The method in accordance with claim 14 including providing said channel with a floor contiguous with said bottom to provide a channel having a depth which extends from at least about said level of said melting media in said first melting bay to said bottom of said first melting bay.

16. The method in accordance with claim 14 including providing a second melting bay between said first melting bay and said adjacent bay and melting self-submerging metal scrap in said second melting bay.

17. The method in accordance with claim 14 wherein molten melting media is molten aluminum and said floatable metal scrap is aluminum metal scrap.

18. The method in accordance with claim 14 including fluxing said molten melting media and said molten scrap in said adjacent bay to remove suspended solids therefrom.

19. The process in accordance with claim 14 wherein said impeller comprises a plate having a top side and lower side, said top side attached to said shaft and at least two flat substantially straight vanes positioned perpendicular to each other extending outwardly and downwardly from the lower side of said plate, a ring mounted to said vanes opposite said plate, said ring defining an opening to receive molten melting media in an axial direction, said vanes and plate cooperating to discharge molten melting media from said impeller in a radial direction.

20. A method of melting metal scrap in a molten melting media, the method comprising:
(a) providing a source of molten melting media in a furnace, the melting media in said furnace having a first surface level;
(b) providing a first bay in fluid communication with said furnace to receive molten melting media from said furnace to provide a body of molten melting media in said first bay, the first melting bay having:
  (i) a bottom; and
  (ii) an outer wall connected to said bottom defining said first bay, said outer wall having a generally spiral shaped cross section terminating in a mouth of a channel for removing melting media to an adjacent bay, said spiral shaped cross section receding away from a generally central axis of said first bay;
(c) supplying molten melting media to said first bay through an opening in said bottom, said supplying being achieved with an impeller mounted on a shaft projecting into said first bay, said impeller:
  (i) cooperating with said opening to force molten melting media into said first bay;
  (ii) positioned to rotate towards said mouth of said channel to direct molten melting media into said channel;
(d) maintaining molten melting media in said first bay at a level higher than said first furnace level; and
(e) directing molten melting media through said channel out of said first bay into an adjacent bay, said level of molten media in said adjacent bay maintained lower than the level in said first bay.

21. A system for melting both floatable metal scrap and self-submerging metal scrap in a molten melting media, the system comprised of:
(a) a furnace for providing a source of molten melting media, the melting media maintained in said furnace at a first surface level;
(b) a first melting bay in fluid communication with said furnace to receive molten melting media from said furnace to provide a body of molten melting media in said first melting bay for purposes of melting metal scrap, the first melting bay defined by:
  (i) a bottom; and
  (ii) a sidewall, said sidewall in cross section having a generally spiral shape terminating in a mouth of a channel for removing melting media and molten scrap, said first melting bay having a generally central vertical axis and said sidewall having said spiral shape receding away from said central axis;
(c) an impeller mounted on a shaft projecting into said first melting bay, said impeller adapted to supply molten melting media to said first melting bay through an opening in said bottom, said impeller:
  (i) cooperating with said opening to force molten melting media into said first melting bay;
  (ii) positioned to rotate toward said mouth of said channel to direct molten melting media into said channel;
  (iii) designed to maintain molten melting media in said first melting bay at a level higher than said first furnace level;
(d) means for generating a vortex in said first melting bay for ingesting scrap into said media for enhanced melting; and
(e) means for adding floatable metal scrap to said first melting bay.

22. The system in accordance with claim 21 wherein said channel has a floor contiguous with said bottom to provide a channel having a depth which extends from at least about said level of said melting media in said first melting bay to said bottom of said first melting bay.

23. The system in accordance with claim 21 wherein said impeller is comprised of a plate having:
(a) a top side and a lower side, said top side attached to said shaft;
(b) at least two substantially flat, straight vanes positioned perpendicular to each other extending outwardly and downwardly from the lower side of said plate; and
(c) a ring mounted to said vanes opposite said plate, said ring defining an opening to receive molten melting media in an axial direction, said vanes and plate cooperating to discharge molten melting media from said impeller in a radial direction.

24. A system for melting both floatable metal scrap and self-submerging metal scrap in a molten melting media, the system comprised of:
(a) a furnace for providing a source of molten melting media, the melting media maintained in said furnace at a first surface level;
(b) a first melting bay in fluid communication with said furnace to receive molten melting media from said furnace to provide a body of molten melting media in said first melting bay for purposes of melting metal scrap, the first melting bay defined by:
  (i) a bottom; and
  (ii) a sidewall, said sidewall in cross section having a generally spiral shape terminating in a mouth of a channel for removing melting media and molten scrap, said first melting bay having a generally central vertical axis and said sidewall having said spiral shape receding away from said central axis;
(c) an impeller mounted on a shaft projecting into said first melting bay, said impeller adapted to supply molten melting media to said first melting bay through an opening in said bottom, said impeller:
  (i) cooperating with said opening to force molten melting media into said first melting bay;
  (ii) positioned to rotate toward said mouth of said channel to direct molten melting media into said channel;
  (iii) designed to maintain molten melting media in said first melting bay at a level higher than said first furnace level;
(d) means for generating a vortex in said first melting bay for ingesting scrap into said media for enhanced melting;
(e) means for adding floatable metal scrap to said first melting bay;
(f) a second melting bay in fluid communication with said first melting bay through said channel; and
(g) means for adding self-submerging metal scrap to said second melting bay.

25. The system in accordance with claim 24 wherein said channel has a floor contiguous with said bottom to provide a channel having a depth which extends from at least about said level of said melting media in said first melting bay to said bottom of said first melting bay.

26. A system for melting metal scrap in a molten melting media, the system comprised of:
(a) a furnace for providing a source of molten melting media, the melting media maintained in said furnace at a first surface level;

(b) a first bay in fluid communication with said furnace to receive molten melting media from said furnace to provide a body of molten melting media in said melting bay, the first melting bay defined by:
  (i) a bottom; and
  (ii) a sidewall, said sidewall in cross section having a generally spiral shape terminating in a mouth of a channel for removing melting media, said first bay having a generally central vertical axis and said sidewall having said spiral shape receding away from said central axis;
(c) an impeller mounted on a shaft projecting into said first bay, said impeller adapted to supply molten melting media to said first bay through an opening in said bottom, said impeller:
  (i) cooperating with said opening to force molten melting media into said first bay; and
  (ii) positioned to rotate toward said mouth of said channel to direct molten melting media into said channel;
(d) a melting bay in fluid communication with said first bay through said channel; and
(e) means for adding metal scrap to said melting bay.

* * * * *